[11] Patent Number: 5,328,941
[45] Date of Patent: Jul. 12, 1994

[54] ORGANOPOLYSILOXANE COMPOSITION FOR THE FORMATION OF A CURED RELEASE FILM

[75] Inventors: Masushi Hayashi, Saitama; Nobuo Kaiya; Shosaku Sasaki, both of Chiba, all of Japan

[73] Assignee: Dow Corning Toray Silicone Co., Ltd., Tokyo, Japan

[21] Appl. No.: 81,044

[22] Filed: Jun. 22, 1993

[30] Foreign Application Priority Data

Jun. 29, 1992 [JP] Japan .................. 4-194879

[51] Int. Cl.$^5$ .................. C08F 2/50; C08G 77/28
[52] U.S. Cl. .................. 522/33; 522/46; 522/99; 528/30
[58] Field of Search .................. 522/99, 46, 33; 528/30

[56] References Cited

U.S. PATENT DOCUMENTS

| | | | |
|---|---|---|---|
| 4,596,720 | 6/1986 | Keryk et al. | 522/99 |
| 4,611,042 | 9/1986 | Rivers-Farrell et al. | 522/99 |
| 4,640,939 | 2/1987 | Cavezzan et al. | 522/99 |
| 4,946,874 | 8/1990 | Lee et al. | 522/99 |
| 5,158,988 | 10/1992 | Kurita et al. | 528/30 |

FOREIGN PATENT DOCUMENTS 061386 of 1975 Japan.
020471 of 1986 Japan.

Primary Examiner—Susan Berman
Attorney, Agent, or Firm—Sharon K. Severance

[57] ABSTRACT

The instant invention pertains to an organopolysiloxane composition for the formation of a cured release film wherein said organopolysiloxane composition cures rapidly under exposure to ultraviolet radiation to form a cured film that tightly adheres to various types of supports or base materials.

The organopolysiloxane composition for the formation of a cured release film of the instant invention is comprised of (A) an organopolysiloxane that contains in each molecule at least 2 higher alkenyl groups as represented by the general formula $$H_2C=CH-(CH_2)_n-$$

wherein n has a value of 2 to 8, (B) an organopolysiloxane that contains at least 2 mercaptoalkyl groups in each molecule, (C) an organopolysiloxane selected from the group consisting of organopolysiloxanes that contain in each molecule 1 higher alkenyl group with the general formula $$C_2C=CH-(CH_2)_n-$$

wherein n=2 to 8 and organopolysiloxanes that contain 1 mercaptoalkyl group in each molecule, and (D) a photosensitizer.

9 Claims, No Drawings

ORGANOPOLYSILOXANE COMPOSITION FOR THE FORMATION OF A CURED RELEASE FILM

BACKGROUND OF THE INVENTION

Ultraviolet-curing organopolysiloxane compositions known for the purpose of preventing adhesion between tacky substances and the surfaces of various types of substrates (e.g., paper, synthetic resin-laminated paper, synthetic resin films, knitted and woven fabrics, metal foils, and so forth) are known in the art. For example ,Japanese Patent Application Laid Open [Kokai or Unexamined] Number Sho 50-61386 [61,386/1975] discloses a composition comprised of a mercapto group-containing organopolysiloxane, a vinyl-containing organopolysiloxane, and a photosensitizer. Japanese Patent Application Laid Open Number Sho 61-20471 [20,471/1986]) discloses a composition comprised of a mercapto group-containing organopolysiloxane and a photosensitizer. Additionally known are organopolysiloxane compositions comprised of an alkenyl-containing organopolysiloxane, a mercapto group-containing silane, a platinum group metal compound, and a photosensitizer.

However, these ultraviolet-curing organopolysiloxane compositions suffer from slow curing rates, facile exfoliation or delamination of the cured film due to its poor adhesion to the various types of substrates, a reduction in the tack of the tacky substance (low residual adhesion ratio), and a strong mercapto odor. The present inventors developed the present invention as the result of extensive investigations for the purpose of solving the drawbacks to the prior art.

An object of the present invention is an organopolysiloxane composition which is useful for the formation of a cured release film wherein said organopolysiloxane composition cures rapidly under exposure to ultraviolet radiation to form a cured film that tightly adheres to various types of supports or base materials.

SUMMARY OF THE INVENTION

The present invention relates to an organopolysiloxane composition that forms a cured release film (hereinafter also referred to as a release film-forming organopolysiloxane composition). More specifically, the present invention relates to a release film-forming organopolysiloxane composition that is cured by exposure to ultraviolet radiation.

THE INVENTION

The present invention relates to an organopolysiloxane composition for the formation of a cured release film wherein said organopolysiloxane composition is comprised of (A) 100 weight parts organopolysiloxane that contains in each molecule at least 2 higher alkenyl groups as represented by the general formula $$H_2C=CH-(CH_2)_n-$$

wherein B has a value of 2 to 8, (B) 1 to 500 weight parts organopolysiloxane that contains at least 2 mercaptoalkyl groups in each molecule, (C) 20 to 300 weight parts of an organopolysiloxane selected from the group consisting of an organopolysiloxane that contains in each molecule 1 higher alkenyl group with the general formula $$H_2C=CH-(CH_2)_n-$$

wherein n has a value of 2 to 8 and an organopolysiloxane that contains 1 mercaptoalkyl group in each molecule, and (D) 0.1 to 50 weight parts photosensitizer.

In the higher alkenyl-containing organopolysiloxane, component (A), of the present invention, the value of n in the formula given above is 2 through 8 and preferably 3 through 8. The composition of the present invention has a slow cured film-formation rate when B is below 2, while synthesis of the organopolysiloxane itself is highly problematic when B exceeds 8. Component (A) must contain at least 2 silicon-bonded higher alkenyl groups in each molecule. When component (A) contains fewer than 2 silicon-bonded higher alkenyl groups, the cure rate will be slow and the residual adhesion ratio will be strongly reduced. While the degree of polymerization of component (A) is not specifically restricted, viscosities of 50 to 100,000 centipoise at 25° C. are preferred from a consideration of the coatability on substrates. Furthermore, the content of cyclic diorganopolysiloxane (tetramer to eicosamer) preferably does not exceed 0.5 weight % based on a consideration of the residual adhesion ratio.

The organopolysiloxane (A) may be exemplified by an organopolysiloxane with the average unit formula $$R^1{}_bSiO_{(4-b)/2}$$

that contains in each molecule at least 2 higher alkenyl groups with the following general formula $$H_2C=CH-(CH_2)_n-$$

wherein n has a value of 2 to 8. $R^1$ in the preceding formula comprises substituted and unsubstituted monovalent hydrocarbon groups. $R^1$ may be exemplified by alkyl groups such as methyl, ethyl, propyl, and butyl; higher alkenyl groups such as hexenyl, heptenyl, butenyl, and pentenyl; aryl groups such as phenyl, tolyl, and xylyl; and substituted alkyl groups such as 2- phenylethyl, 2-phenylpropyl, and 3,3,3-trifluoropropyl. Methyl preferably comprises at least 70 mol % of $R^1$ from the perspective of the release properties. In addition, b has a value of 1.95 to 2.05 on average. Component (A) may contain small quantities of silicon-bonded hydroxyl groups or alkoxy groups. The structure of the organopolysiloxane (A) is not specifically restricted and may be straight chain or slightly branched. Mixtures of two or more of these types may also be used. Specific examples of component (A) are as follows: dimethylbutenylsiloxy-terminated dimethylpolysiloxanes, dimethylpentenylsiloxy-terminated dimethylpolysiloxanes, dimethylhexenylsiloxy-terminated dimethylpolysiloxanes, dimethylheptenylsiloxy-terminated dimethylpolysiloxanes, dimethyloctenylsiloxy-terminated dimethylpolysiloxanes, trimethylsiloxy-terminated butenylmethylsiloxane-dimethylsiloxane copolymers, silanol-terminated butenylmethylsiloxane-dimethylsiloxane copolymers, trimethylsiloxy-terminated pentenylmethylsiloxane-dimethylsiloxane copolymers, trimethylsiloxy-terminated methylhexenylsiloxane-dimethylsiloxane copolymers, silanol-terminated methylhexenylsiloxane-dimethylsiloxane copolymers, trimethylsiloxy-terminated methylheptenylsiloxane-dimethylsiloxane copolymers, trimethylsiloxy-terminated methyloctenylsiloxane-dimethylsiloxane copolymers, dimethylpentenylsiloxy-terminated methylphenylsiloxane-dimethylsiloxane copolymers, silanol-terminated methylpentenylsiloxane-dimethylsiloxane copolymers, dimethylhexenylsiloxy-terminated methylhexenylsiloxane-dimethylsiloxane copolymers, and dimethylhexenylsiloxy-terminated diphenylsiloxane-dimethylsiloxane copolymers.

Component (B) employed in the present invention reacts with component (A) to form the cured film. Component (B) must contain at least 2 silicon-bonded mercaptoalkyl groups in each molecule. When component (B) contains fewer than 2 silicon-bonded mercaptoalkyl groups, the cure rate will be slow and the residual adhesion ratio will be strongly reduced. The organopolysiloxane (B) may be exemplified by an organopolysiloxane with the average unit formula.

$$R^2{}_c SiO_{(4-c)/2}$$

$R^2$ in the preceding formula may be exemplified by methyl, ethyl, propyl, butyl, and these groups in which hydrogen has been substituted by halogen or the mercapto group. Methyl preferably comprises at least 50 mol % of $R^2$ based on a consideration of the release properties. c has a value of 1.95 to 2.05 on average. Component (B) may contain small quantities of silicon-bonded hydroxyl groups or alkoxy groups. The molecular structure of component (B) is not specifically restricted, and it may be any of straight chain, branched, cyclic, or network with straight chain and branched being preferred. While the degree of polymerization of component (B) is not specifically restricted, viscosities of 50 to 100,000 centipoise at 25° C. are preferred based on considerations of ease of preparation and the coatability on substrates. Component (B) may be exemplified by, but not limited to: trimethylsiloxy-terminated methyl(3-mercaptopropyl)siloxane-dimethylsiloxane copolymers, 3-mercaptopropyl-endblocked dimethylsiloxane-diphenylsiloxane copolymers, and silanol-terminated methyl(3-mercaptopropyl)siloxane-dimethylsiloxane-methylphenylsiloxane copolymers. Component (B) may consist of a single type or 2 or more types of the preceding. The specific amount of component (B) used in the present invention will vary depending on the quantity of functional group in component (A) (higher alkenyl) and the quantity of functional group in this component (mercaptoalkyl), but its quantity of addition must fall in the range of 1 to 500 weight parts per 100 weight parts component (A). The addition of less than 1 weight part component (B) or more than 500 weight parts component (B) per 100 weight parts component (A) creates an imbalance between components (A) and (B) that results in a slow curing rate and a substantial decline in the residual adhesion ratio.

Component (C) used by the present invention is employed in order to facilitate release and improve adhesion for various types of substrates. Component (C) comprises an organopolysiloxane selected from the group consisting of organopolysiloxanes that contains in each molecule 1 higher alkenyl group with the general formula $$H_2C=CH-(CH_2)_n-$$

wherein n has a value of 2 to 8 and organopolysiloxanes that contain 1 mercaptoalkyl group in each molecule. Either or both of these two types of organopolysiloxanes may be used as the component under consideration.

Each molecule of the higher alkenyl-containing organopolysiloxane, component (C), must contain 1 higher alkenyl group with the general formula $$H_2C=CH-(CH_2)_n-$$

wherein n has a value of 2 to 8. The presence of less than 1 causes a substantial decline in the residual adhesion ratio while the presence of 2 or more attenuates the capacity to facilitate release and increase adhesion for various types of substrates. The higher alkenyl-containing component (C) should have a viscosity of 50 to 100,000 centipoise at 25° C. and a cyclic diorganopolysiloxane content (tetramet to eicosamer) not exceeding 0.5 weight % for the same reasons as given for component (A). Examples of the silicon-bonded higher alkenyl group in component (C) are the same as provided above in the description of the organopolysiloxane of component (A).

Component (C) may also be an organopolysiloxane that contains 1 mercaptoalkyl group in each molecule. The presence of less than 1 causes a substantial decline in the residual adhesion ratio while the presence of 2 or more attenuates the ability to facilitate release and increase adhesion for various types of substrates. Examples of the mercapto group in this constituent are the same as provided above in the description of the organopolysiloxane of component (B).

Component (C) should be added at 20 to 300 weight parts per 100 weight parts component (A). The improvement in release performance and the improvement in adhesion for various types of substrates are reduced at an addition of less than 20 weight parts per 100 weight parts component (A). The addition of more than 300 weight parts per 100 weight parts component (A) causes a substantial decline in the residual adhesion ratio.

The photosensitizer, component (D), in the present invention comprises known photosensitizers ordinarily used in ultraviolet-curable resins. Component (D) may be exemplified by, but not limited to, aromatic compounds such as acetophenone, propiophenone, 2,2-diethoxyacetophenone, 3-methylacetophenone, alpha-dimethylaminoacetophenone, alpha-dimethylaminopropiophenone, 1-hydroxycyclohexyl phenyl ketone, 2-hydroxy-2-methyl-1-phenylpropan-1-one, 1-(4-isopropylphenyl)-2-hydroxy-2-methylpropan-1-one, benzophenone, 2-chlorobenzophenone, 4,4'-dichlorobenzophenone, 4,4'-bis(dimethylamino)benzophenone, 4-methoxybenzophenone, 3,3'-dimethyl-4-benzophenone, Michler's ketone, methyl ortho-benzoytbenzoate, methyl benzoylformate, benzil, benzil dimethyl ketal, benzoin, benzoin methyl ether, benzoin ethyl ether, benzoin isopropyl ether, benzoin n-propyl ether, benzoin isobutyl ether, benzoin n-butyl ether, xanthone, thioxanthone, 2-methylxanthone, anthraquinone, benzaldehyde, fluorene, fluorein, and carbazole; organoperoxides such as benzoyl peroxide and dicumyl peroxide; azo compounds such as azobisisobutyronitrile; amines such as triphenylamine; and organosilicon group-containing benzoin derivatives. The photosensitizer may be dissolved in methyl ethyl ketone, ethyl acetate, toluene, trichloroethane, xylene, and others. The photosensitizer should be added at 0.1 to 50 weight parts per 100 weight parts component (A) and is preferably added at 0.5 to 20 weight parts.

The release film-forming organopolysiloxane composition of the present invention is prepared simply by mixing the components (A), (B), (C), and (D) as described hereinbefore. Thickener, cured film strengthener, heat stabilizer, colorant, and so forth may be added on an optional basis.

The UV source for curing the release film-forming organopolysiloxane composition of the present invention comprises the known UV sources and is specifically exemplified by xenon discharge tubes and low-pressure, medium-pressure, and high-pressure mercury lamps. The UV exposure conditions are not specifically restricted.

With regard to the actual application of the release film-forming organopolysiloxane composition of the present invention to the surface of sheet-form substrates such as paper, synthetic films, polyethylene-laminated paper, and so forth, the composition may be directly coated without alteration or it may be applied diluted with organic solvent capable of dissolving the composition. Operative organic solvents are exemplified by aromatic hydrocarbons such as benzene, toluene, and xylene; aliphatic hydrocarbons such as heptane, hexane, and pentane; ethyl acetate; methyl ethyl ketone; and halogenated hydrocarbons such as trichloroethylene and perchloroethylene.

So that those skilled in the art can understand and appreciate the invention taught herein, the following examples are presented, being it understood that these examples should not be used to limit the scope of this invention found in the claims attached hereto.

The curability, adhesion, peeling resistance, and residual adhesion ratio referenced in the examples were measured in accordance with the following methods. Furthermore, in the examples and comparison examples, "mercaptopropyl group" denotes the "3-mercaptopropyl group".

Curability

A prescribed quantity of the organopolysiloxane composition was applied on the surface of a sheet-form substrate and then irradiated for a prescribed period of time with ultraviolet radiation from an ultraviolet source that employed a high-pressure mercury lamp (120 W/cm). The surface of the cured film was then forcefully rubbed with a finger and the film was examined for dulling and delamination. The cure time was designated as the time at which neither dulling nor delamination were observed.

Peeling resistance

The organopolysiloxane composition was coated at a rate of 1 g/m$^2$ on the surface of high-grade polyethylene-laminated paper. A cured organopolysiloxane film was produced by exposure to ultraviolet radiation for the period of time required for curing in the particular case. An acrylic-based pressure-sensitive adhesive (Oribine BPS-5127 from Toyo Ink Mfg. Company, Limited) was then coated on the surface of the film followed by heating at 70° C. for 2 minutes. High-quality paper (unit weight=80 g/m$^2$) was subsequently applied using a rubber roller, and the assembly was aged at 25° C. under a load of 20 g/cm$^2$ for the reported time to yield the measurement specimen. A 5.0 cm-wide test specimen was then cut from the measurement specimen, and the paper layers glued together in the test specimen were pulled apart at an angle of 180° and a rate of 30 cm/minute using a tensile tester in order to measure the force (g) required for tensile delamination.

Residual adhesion ratio

The organopolysiloxane composition was cured into the film on the surface of high-grade polyethylene-laminated paper by the same method as for the peeling resistance, and polyester tape (Polyester Tape 31B from Nitto Denko Kabushiki Kaisha) was applied to the film's surface. The assembly was heated at 70° C. for 20 hours under a load of 20 g/cm$^2$. The tape was then peeled off, re-adhered on stainless steel plate using a 2 kg rubber roller, and finally re-peeled using a tensile tester in order to measure the residual adhesive force. In addition, the native adhesive force of the polyester tape was measured by applying the untreated polyester tape on stainless steel plate using a 2 kg rubber roller and peeling this using a tensile tester. The residual adhesion ratio was calculated from these adhesive force values using the following equation.

residual adhesion ratio (%)=(residual adhesive force/native adhesive force)×100

EXAMPLE 1

A release film-forming organopolysiloxane composition was prepared by mixing the following: 100 g trimethylsiloxy-terminated dimethylsiloxane-methylhexenylsiloxane copolymer (5 hexenyl groups per molecule, degree of polymerization=140), 100 g trimethylsiloxy-terminated dimethylsiloxane-methylmercaptopropylsiloxane copolymer (4 mercaptopropyl groups per molecule, degree of polymerization=200), 100 g trimethylsiloxy-terminated dimethylsiloxane-methylmercaptopropylsiloxane copolymer (1 mercaptopropyl group per molecule, degree of polymerization=200), and 1 g acetophenone. This composition was measured for its curability, residual adhesion ratio, and peeling resistance, and these results are reported in Table 1.

EXAMPLE 2

A release film-forming organopolysiloxane composition was prepared by mixing the following: 100 g trimethylsiloxy-terminated dimethylsiloxane-methylhexenylsiloxane copolymer (5 hexenyl groups per molecule, degree of polymerization=140), 450 g trimethylsiloxy-terminated dimethylsiloxane-methylmercaptopropylsiloxane copolymer (4 mercaptopropyl groups per molecule, degree of polymerization=200), 250 g trimethylsiloxy-terminated dimethylsiloxane-methylhexenylsiloxane copolymer (1 hexenyl group per molecule, degree of polymerization=200), and 1 g acetophenone. This composition was measured for its curability, residual adhesion ratio, and peeling resistance, and these results are reported in Table 1.

EXAMPLE 3

A release film-forming organopolysiloxane composition was prepared by mixing the following: 100 g trimethylsiloxy- terminated dimethylsiloxanemethylhexenylsiloxane copolymer (5 hexenyl groups per molecule, degree of polymerization=250) 80 g 3-mercaptopropyl-terminated dimethylsiloxanemethyl 3-mercaptopropyl siloxane copolymer (4 mercaptopropyl groups per molecule, degree of polymerization=200), 50 g trimethylsiloxy-terminated dimethylsiloxanemethylhexenylsiloxane copolymer (1 hexenyl group per molecule, degree of polymerization=200), and 1 g benzophenone. This composition was measured for its curability, residual adhesion ratio, and peeling resistance, and these results are reported in Table 1.

COMPARISON EXAMPLE 1

An organopolysiloxane composition was prepared as in Example 1, but in this case using trimethylsiloxy-terminated dimethylsiloxane-methylvinylsiloxane copolymer (change from hexenyl to vinyl) in place of the trimethylsiloxy-terminated dimethylsiloxane-methylhexenylsiloxane copolymer. This composition was measured for its curability, residual adhesion ratio, and peeling resistance, and these results are reported in Table 1.

COMPARISON EXAMPLE 2

An organopolysiloxane composition was prepared as in Example 1, but in this case omitting the trimethylsiloxy-terminated dimethylsiloxane-methylmercaptopropylsiloxane copolymer (1 mercaptopropyl group per molecule, degree of polymerization=200). This composition was measured for its curability, residual adhesion ratio, and peeling resistance, and these results are reported in Table 1.

COMPARISON EXAMPLE 3

An organopolysiloxane composition was prepared as in Example 1, but in this case using 15 weight parts of the trimethylsiloxy-terminated dimethylsiloxane-methylmercaptopropylsiloxane copolymer (1 mercaptopropyl group per molecule, degree of polymerization=200). This composition was measured for its curability, residual adhesion ratio, and peeling resistance, and these results are reported in Table 1.

COMPARISON EXAMPLE 4

An organopolysiloxane composition was prepared as in Example 2, but in this case using 350 weight parts of the trimethylsiloxy-terminated dimethylsiloxane-methylhexenylsiloxane copolymer (1 hexenyl group per molecule, degree of polymerization=200). This composition was measured for its curability, residual adhesion ratio, and peeling resistance, and these results are reported in Table 1.

COMPARISON EXAMPLE 5

An organopolysiloxane composition was prepared as in Example 3, but in this case using trimethylsiloxy-terminated polydimethylsiloxane (degree of polymerization=200) in place of the trimethylsiloxy-terminated dimethylsiloxanemethylhexenylsiloxane copolymer (1 hexenyl group per molecule, degree of polymerization=200). This composition was measured for its curability, residual adhesion ratio, and peeling resistance, and these results are reported in Table 1.

TABLE 1

| | cure time (seconds) | residual adhesion ratio (%) | peeling resistance (g/5 cm) | | |
|---|---|---|---|---|---|
| | | | after 1 day | after 10 days | after 30 days |
| Example 1 | 0.3 | 96 | 10 | 12 | 14 |
| Example 2 | 0.3 | 96 | 11 | 13 | 13 |
| Example 3 | 0.25 | 97 | 11 | 15 | 14 |
| Comparison Example 1 | 0.7 | 97 | 32 | 48 | 195 |
| Comparison Example 2 | 0.3 | 97 | 30 | 45 | 179 |
| Comparison Example 3 | 0.3 | 96 | 21 | 33 | 97 |
| Comparison Example 4 | 0.5 | 85 | 11 | 13 | 14 |
| Comparison Example 5 | 0.4 | 78 | 12 | 13 | 13 |

The release film-forming organopolysiloxane composition of the present invention cures rapidly upon exposure to ultraviolet radiation, adheres strongly to the surfaces of various types of substrates (e.g., synthetic films, paper, and so forth), and is very releasable from tacky substances.

What is claimed is:

1. An organopolysiloxane composition for the formation of a cured release film wherein said organopolysiloxane composition comprises
   (A) 100 weight parts of an organopolysiloxane that contains in each molecule at least 2 higher alkenyl groups represented by the formula $H_2C=CH-(CH_2)_n-$ wherein n has a value of 2 to 8,
   (B) 1 to 500 weight parts of an organopolysiloxane that contains at least 2 mercaptoalkyl groups in each molecule,
   (C) 20 to 300 weight parts of an organopolysiloxane selected from the group consisting of organopolysiloxanes that contain in each molecule 1 higher alkenyl group with the general formula $H_2C=CH-(CH_2)_n-$ wherein $n=2$ to 8 and organopolysiloxanes that contain 1 mercaptoalkyl group in each molecule, and
   (D) 0.1 to 50 weight parts of a photosensitizer.
2. An organopolysiloxane composition as claimed in claim 1 wherein (A) is a trimethylsiloxy-terminated dimethylsiloxane-methylhexenylsiloxane copolymer with 5 hexenyl groups per molecule.
3. An organopolysiloxane composition as claimed in claim 1 wherein (B) is a trimethylsiloxy-terminated methyl(3-mercaptopropyl)siloxane-dimethylsiloxane copolymer with 4 mercaptopropyl groups per molecule.
4. An organopolysiloxane composition as claimed in claim 1 wherein (B) is a 3-mercaptopropyl-terminated dimethylsiloxane-methyl 3-mercaptopropylsiloxane copolymer with 4 mercaptopropyl groups per molecule.
5. An organopolysiloxane composition as claimed in claim 1 wherein (C) is trimethylsiloxy-terminated methyl(3-mercaptopropyl)siloxane-dimethylsiloxane copolymer with 1 mercaptopropyl group per molecule.
6. An organopolysiloxane composition as claimed in claim 1 wherein (C) is a trimethylsiloxy-terminated dimethylsiloxane-methylhexenylsiloxane copolymer with 1 hexenyl group per molecule.
7. An organopolysiloxane composition as claimed in claim 1 wherein (D) is acetophenone.
8. An organopolysiloxane composition as claimed in claim 1 wherein (D) is benzophenone.
9. The composition as claimed in claim 1 that has been cured on a substrate with ultraviolet radiation.